June 17, 1969
H. J. JESSEN ET AL
3,449,845
EARTHMOVING SCRAPER BOWL SUSPENSION WITH SAFETY FEATURES
Filed Dec. 15, 1966
Sheet 2 of 2
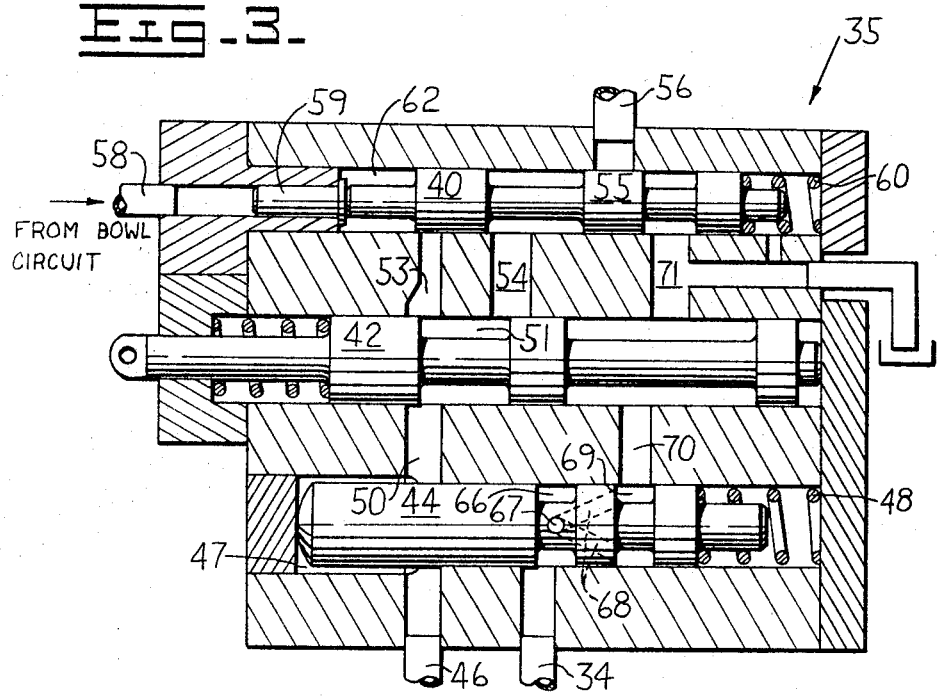
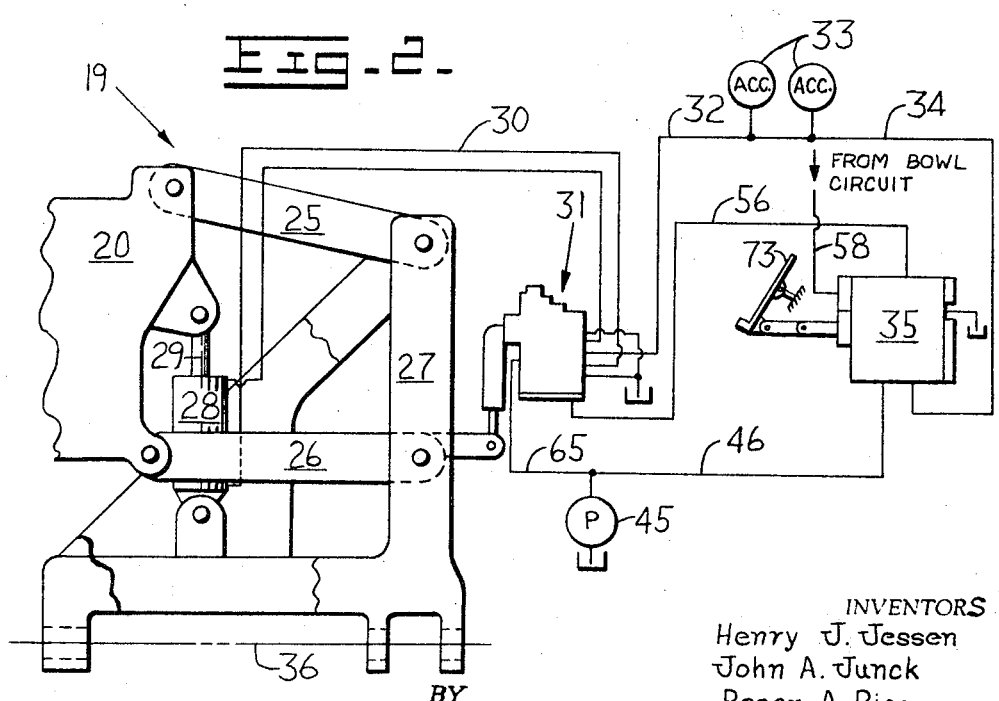
INVENTORS
Henry J. Jessen
John A. Junck
Roger A. Rice
BY
ATTORNEYS

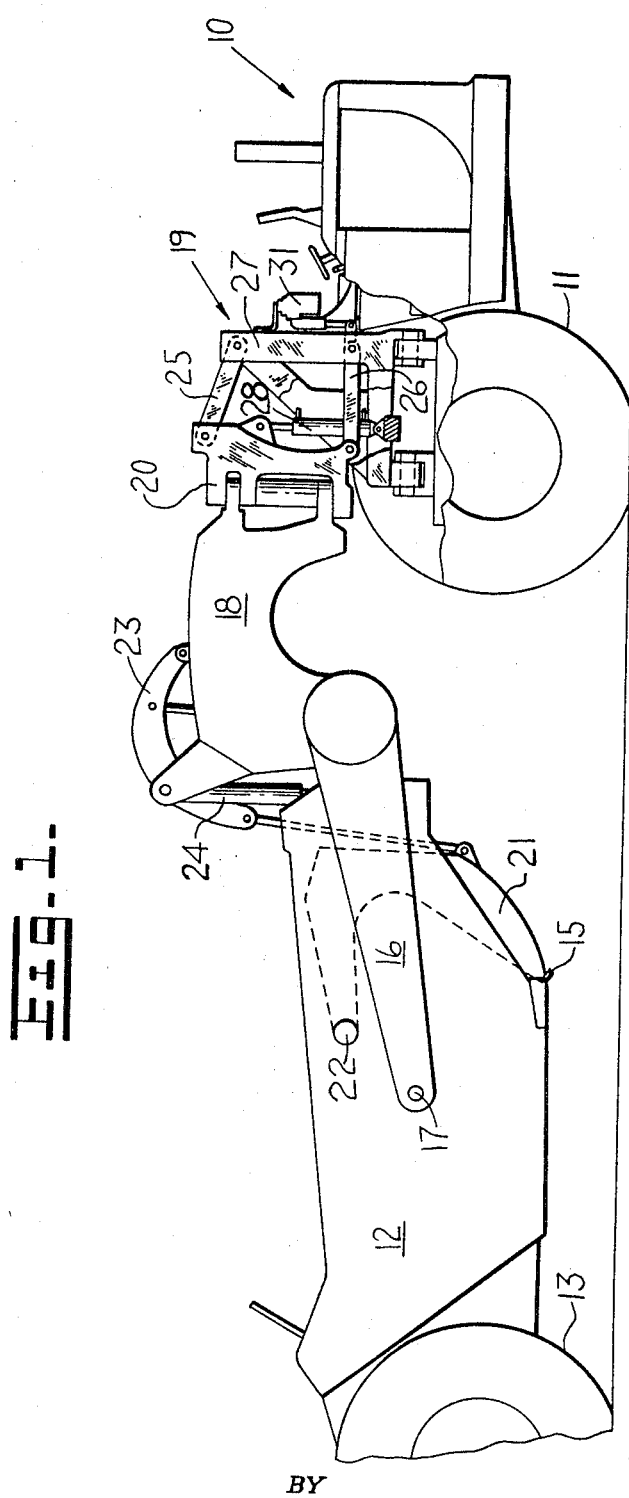

United States Patent Office

3,449,845
Patented June 17, 1969

3,449,845
EARTHMOVING SCRAPER BOWL SUSPENSION WITH SAFETY FEATURES
Henry J. Jessen, Manhattan, and John A. Junck and Roger A. Rice, Joliet, Ill., assignors to Caterpillar Tractor Co., Peoria, Ill., a corporation of California
Filed Dec. 15, 1966, Ser. No. 602,082
Int. Cl. E02f 3/62; B60d; E03b
U.S. Cl. 37—129                                    1 Claim

ABSTRACT OF THE DISCLOSURE

A pressure system for providing resiliency to reduce pitch and bounce in association with the hitch between tractors and scrapers, and particularly to safety features in such a system including means to retard discharge of pressure from the system when the tractor engine is shut down.

---

This invention relates to systems for providing resiliency to reduce pitch and bounce in association with the hitch between tractors and scrapers, and particularly to safety features in such a system.

In our assignee's co-pending application of Barton, Carter and Roberts, application Ser. No. 461,887, now U.S. Patent No. 3,311,389 entitled "System for control of Pitch and Bounce in Tractor-Trailer Combinations," a hitch is disclosed which employs a hydraulic cylinder in communication with air over oil accumulators to provide the desired control. The accumulator or accumulators, as the case may be, should be discharged when the equipment is not in use and this is accomplished automatically upon shutdown of the tractor engine and stopping of the pump which charges the accumulators.

It is customary, in the interest of safety, to lower the scraper bowl into contact with the earth when the scraper is to be left unattended. It then becomes dangerous to start the engine and pump to cause charging of the accumulator and hydraulic cylinder which can raise the bowl out of contact with the ground when the operator may not be prepared to control the machine if it starts to move.

Another dangerous and undesirable condition results from the fact that engine shutdown, whether accidental or intentional, causes automatic discharge of accumulator and hitch pressure. Rapid discharge of accumulator pressure would require complete charge of the accumulators each time the engine is re-started, which would cause certain periods of unnecessary delay.

It is the object of the present invention to overcome the unsafe features of operation related above and to provide means to prevent actuation of the hitch circuitry until the operator is at his station and in control of the machine, and means to prevent sudden discharge of the accumulator and to cause discharge to take place over a period of time that permits re-starting of the engine. Further objects and advantages of the invention and the manner in which it is carried into practice are made apparent in the following specification wherein reference is made to the accompanying drawings.

In the drawings:

FIG. 1 is a schematic view and side elevation of a two-wheeled tractor and trailer combination to which the present invention is applicable;

FIG. 2 is a schematic view illustrating the mechanism and circuits which provide desired resiliency between the tractor and trailer; and FIG. 3 is an enlarged schematic sectional view of one of the control valves of the resilient circuit which embodies the improvements of the present invention.

The principal parts of a two-wheeled tractor and scraper combination are schematically illustrated in FIG. 1 of the drawings where tractor 10 is shown as having a pair of supporting wheels, one of which is illustrated at 11. The trailer, in this case in the form of a scraper, comprises a bowl 12 pivotally supported by wheels, one of which is partially shown at 13, so that it may be raised and lowered about the axis of the wheels between the carrying position shown, or a lower position where a cutting edge 15 of the bowl engages and cuts earth to fill the bowl as the scraper moves forwardly. A draft assembly comprises spaced arms, one of which is illustrated at 16, pivoted as at 17 to opposite sides of the bowl and rigidly connected with a forwardly extending gooseneck 18 secured to the tractor through a hitch assembly generally indicated at 19, to which the draft assembly is pivotally connected as at 20. A conventional apron 21 is pivoted to the sides of the bowl as at 22 and may be moved to and from a position closing the front of the bowl by means of linkage 23 and suitable power means (not shown). The forward end of the bowl is raised and lowered by hydraulic jacks, one of which is shown at 24, extending between a bracket on the gooseneck 18 and the forward portion of the bowl.

The cushioning mechanism which forms a part of the hitch is schematically shown in FIG. 2 wherein the casting which supports the pivotal connection 20 of FIG. 1 is connected as by a pair of pivoted links 25 and 26 to an A-frame 27, which is pivotally connected to the tractor as on a horizontal pivotal axis indicated at 36, as is conventional practice. The links 25 and 26 enable realtive vertical movement to take place between the tractor and trailer at the hitch, and this movement is resisted by fluid in the cylinder 28 which has a conventional piston therein on a rod 29. The cylinder is pivotally connected to the A-frame on the tractor and the rod to the hinged part, which is in effect a part of the scraper. The lower or head end of the cylinder communicates through a line 30 to the combination pilot, leveling and lockout valve assembly generally indicated at 31, through a line 32 to accumulators 33 and thence through a line 34 to a combination safety, lockout and accumulator bleed valve assembly generally indicated at 35. The valve 31 is fully disclosed in the application herein above referred to and a detailed description of its operation is not essential to an understanding of the present invention. It is in the construction of the combination valve assembly 35 that the present invention resides and this construction is schematically illustrated in FIG. 3.

FIG. 3 shows a housing containing a safety spool 40, a lockout spool 42 and an accumulator bleed or discharge spool 44. These spools are shown in the positions that they assume when the engine is shut down so that a pump shown at 45 in FIG. 2 is not directing hydraulic fluid under pressure through a line 46 toward the valve 35, and the bowl of the scraper is resting on the ground. The first step which takes place in conditioning the machine for useful work is starting of the engine which is accompanied by starting of the pump 45 in the accumulator circuit and also a pump (not shown) which supplies pressure for operating the scraper, including raising and lowering of the bowl.

When the pump 45 starts, pressure directed through line 46 to a chamber 47 at the end of spool 44 urges the spool toward the right against the force of a spring 48 and closes accumulator discharge passages in a manner presently to be described. The pressure is free to pass from chamber 47 through a passage 50 which communicates through an annular groove 51 in valve spool 42 to passages 53 and 54, both leading to the bore of spool 40. Passage 54 is blocked by a land 55 on spool 40, which closes communication to a line 56 leading, as best shown in FIG. 2, to the valve 31 which, in turn, controls pressure to the cylinder 28 through line 30. To prevent the direction of pressure into the head end of the cylinder, which could raise the forward end of the scraper and lift the bowl free of the ground, until the operator is in a controlling position, the spool 40 is actuated only upon the event of pressure in the bowl circuit which occurs when the operator actuates the valve, not shown, which raises the bowl. This pressure is communicated through a line 58 and acts upon a plunger 59 which is reciprocally mounted adjacent the end of spool 40. The plunger moves the spool against the force of a spring 60 at its opposite end to uncover port 53, permitting pump pressure to enter a chamber 62 at the end of spool 40 for retaining it in a position where land 55 has uncovered the entrance to line 56. Pressure in this line actuates the valve assembly 31 in a manner which is described in detail in the above referred to application for permitting pump fluid in line 65 to flow to the cylinder 28 until the hitch attains a level attitude and the accumulators are charged sufficiently to maintain the level attitude. Thus, even though the engine of the tractor has been started, the cylinder 28 cannot be pressurized to lift the bowl until the operator is at his station and has already activated the bowl lift circuit.

Whenever the engine of the tractor is shut down (intentionally or accidentally), accumulator pressure is bled through the accumulator discharge valve spool 44. Pump pressure from pump 45 fails upon engine shutdown, thus reducing pressure in chamber 47 and enabling the spring 48 to move the spool 44 toward the leftmost position shown, wherein a groove 66 registers with line 34 which communicates with the accumulators. A restricting orifice 67 in the spool at groove 66 communicates fluid through passages 68 and a groove 69, thence through a passage 70 through the bore of spool 42 and out through passage 71 to the tank as shown. Because of the restriction provided by orifice 67, a considerable period of time is required to reduce the pressure in the accumulators to a non-functional level. With a three to four-minute complete discharge delay thus provided, it is generally possible to re-start a stalled engine without requiring full re-charging of the accumulators.

The operation of the lockout spool 42 need not be described herein as it is fully set forth in the above-mentioned application and its function is simply to permit bleeding of oil from the hydraulic cylinder 28 during the time that the scraper bowl is being filled with earth and it is actuated by a foot pedal shown at 73 in FIG. 2, which has replaced a hand actuated lever described in the above application for performing the same function.

What is claimed is:

1. In a tractor-scraper combination having a hitch with hydro-pneumatic suspension including a first circuit with a hydraulic pump operatively connected to scraper raising means, said scraper raising means being connected between said hitch and said scraper to lift the scraper away from the ground when activated and when deactivated to permit lowering of the scraper toward the ground, said first circuit including pressure accumulators, said scraper having a bowl and a separate second hydraulic circuit operatively connected to bowl raising means, said bowl raising means being connected between said hitch and said bowl for raising and lowering the bowl whereby the bowl may be lowered into contact with the ground for safety when the engine is shut down and the combination is parked, means interconnected to both said first and second circuits to prevent activation of the hydro-pneumatic suspension for raising the scraper until after pressure has been applied in the bowl raising circuit, means to retard discharge from the accumulators upon deactivation of the suspension system as by shutdown of the engine which drives its pump to minimize the time required to recharge the accumulators if the engine is restarted during the delay period, in which said retarding means comprises a discharge passage in circuit with the accumulators' system, a valve controlling said passage, flow restricting means leading to the passage when the valve is open, said valve being of the sliding spool type urged to its open position by a spring at one end of the spool, and urged to its closed position by system pressure at the opposite end of the spool.

References Cited

UNITED STATES PATENTS

| | | | |
|---|---|---|---|
| 2,815,223 | 12/1957 | Wharton | 280—406 |
| 3,118,686 | 1/1964 | McAdams | 280—489 X |
| 3,250,526 | 5/1966 | Kress | 267—64 |
| 3,299,547 | 1/1967 | Gee et al. | 37—129 |
| 3,304,633 | 2/1967 | Hein et al. | 37—129 |
| 3,311,389 | 3/1967 | Barton et al. | 280—489 |
| 3,321,216 | 5/1967 | Carter | 280—489 |

ROBERT E. PULFREY, *Primary Examiner.*

EUGENE H. EICKHOLT, *Assistant Examiner.*

U.S. Cl. X.R.

137—625.12; 180—14; 267—64; 280—489